United States Patent
Bobbitt, III

[11] Patent Number: 5,887,463
[45] Date of Patent: Mar. 30, 1999

[54] STEERING COLUMN LOCKING PIN

[75] Inventor: John T. Bobbitt, III, Kenilworth, England

[73] Assignee: The Torrington Company, Torrington, Conn.

[21] Appl. No.: 881,734

[22] Filed: Jun. 24, 1997

[51] Int. Cl.$^6$ .................................................. B60R 25/02
[52] U.S. Cl. ................................ 70/182; 70/252; 70/186
[58] Field of Search ............................... 70/182–186, 252

[56] References Cited

U.S. PATENT DOCUMENTS

| | | | |
|---|---|---|---|
| 1,336,384 | 4/1920 | Smith . | |
| 3,795,122 | 3/1974 | Lipschutz | 70/182 |
| 4,413,491 | 11/1983 | Thirion | 70/186 X |
| 4,552,000 | 11/1985 | Lipschutz | 70/185 |
| 4,771,618 | 9/1988 | Weber et al. | 70/182 X |
| 4,776,189 | 10/1988 | Weber et al. | 70/182 |
| 4,854,141 | 8/1989 | Haldric et al. | 70/182 |
| 5,036,686 | 8/1991 | Ichinose | 70/186 |

FOREIGN PATENT DOCUMENTS 469501  3/1952  Italy .......................................... 70/186

Primary Examiner—Suzanne Dino Barrett
Attorney, Agent, or Firm—Robert F. Palermo

[57] ABSTRACT

A locking device is disclosed for locking a steering column of a vehicle against rotation, relative to a fixed structure of the vehicle, the steering column including a steering shaft. The device includes a locking bar attached to the fixed structure of the vehicle, the locking bar being free to reciprocate between locked and unlocked positions adjacent to the steering shaft; and a member projecting transversely from the steering shaft for engaging with the locking bar to limit rotation of the steering shaft when the locking bar is in the locked position.

5 Claims, 2 Drawing Sheets

STEERING COLUMN LOCKING PIN

BACKGROUND OF THE INVENTION

This invention relates generally to steering column locking systems and more particularly to a simplified, compact, and light weight device for preventing movement of a steering column when the ignition switch is locked.

Steering column locks for discouraging auto theft are well known and are included on all automobiles of current manufacture. These generally take the form of a pin or pawl which reciprocates either axially or radially, relative to the steering column, to engage a slot in a lock ring or a lock sleeve. When the ignition switch is turned to the locked position, the pin moves into engagement with the slot and prevents movement of the steering column.

Fabrication of steering columns including such locks requires manufacturing the lock collar or sleeve, staking or otherwise fastening it to the steering shaft, and aligning the reciprocation path of the pin or pawl with the slot(s) of the lock ring. This requires a degree of precision and a number of fabrication operations which increases manufacturing costs. Also, the locking ring is necessarily bulky and imposes space and weight penalties on the vehicle.

The foregoing illustrates limitations known to exist in present steering column locking devices, and it would be advantageous to provide an alternative directed to overcoming one or more of those limitations. Accordingly, a suitable alternative is provided including features more fully disclosed hereinafter.

SUMMARY OF THE INVENTION

In one aspect of the present invention, a locking device is provided, including a steering column locking pin for locking a steering column of a vehicle against rotation, relative to a fixed structure of the vehicle, the steering column including a steering shaft. The device comprises a single locking bar attached to the fixed structure of the vehicle, the locking bar being reciprocatable between locked and unlocked positions adjacent to the steering shaft; and members fixedly attached to and projecting transversely from the steering shaft for engagement by the locking bar, when the locking bar is in the locked position, to limit rotation of the steering shaft.

The foregoing and other aspects of the invention will become apparent from the following detailed description, when considered in conjunction with the accompanying drawings.

DETAILED DESCRIPTION

Figure 1:
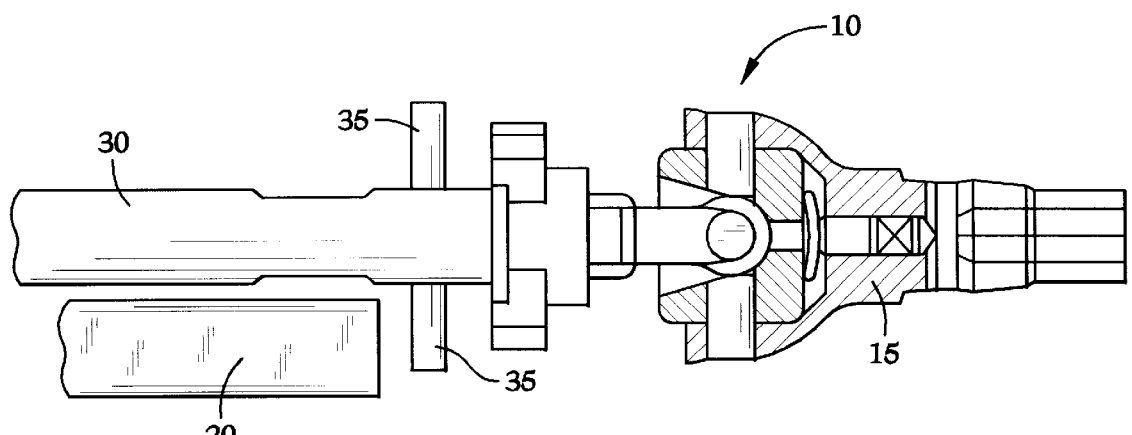
FIG. 1 is a schematic fragmentary side view illustrating an embodiment of the steering column locking device of the invention in a unlocked condition.
Figure 2:
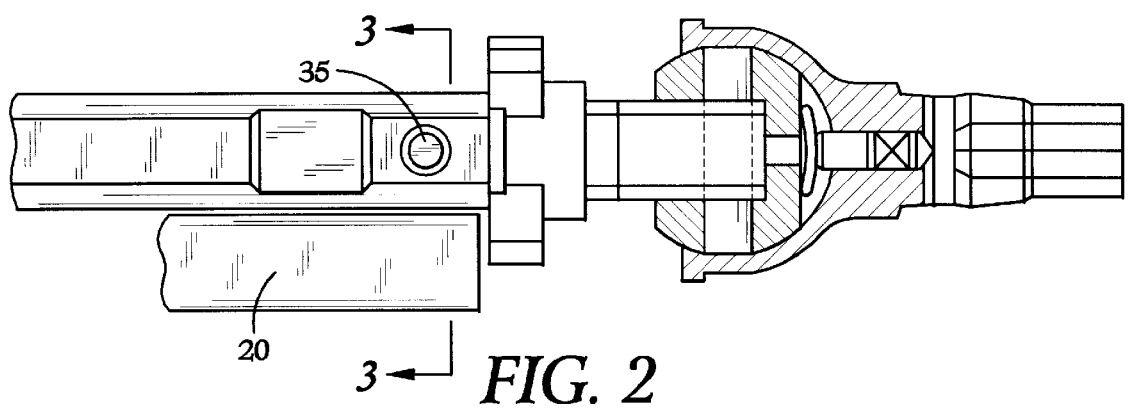
FIG. 2 is a schematic fragmentary side view illustrating the steering column locking device of FIG. 1a locked condition.
Figure 3A:
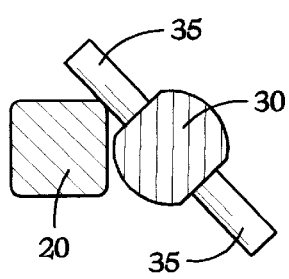
FIGS. 3a, 3b, and 3c are schematic sectional end views, taken at 3—3 of FIG. 2, to show the limits of motion of the steering shaft when the steering column is locked.
Figure 3B:
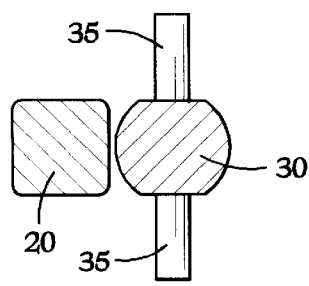
Figure 3C:
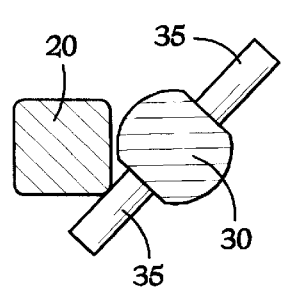
Figure 4:
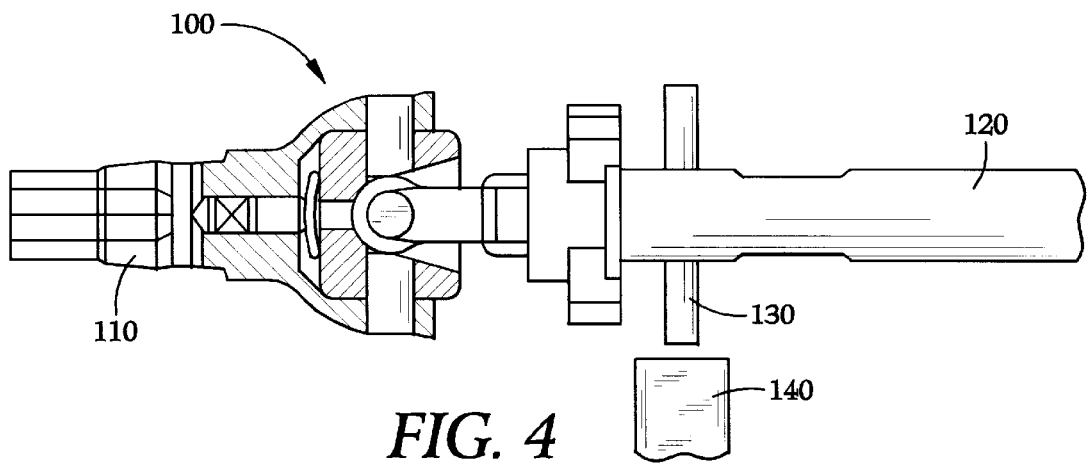
FIG. 4 is a fragmentary schematic side view of an alternative embodiment of the invention in the unlocked condition.
Figure 5:
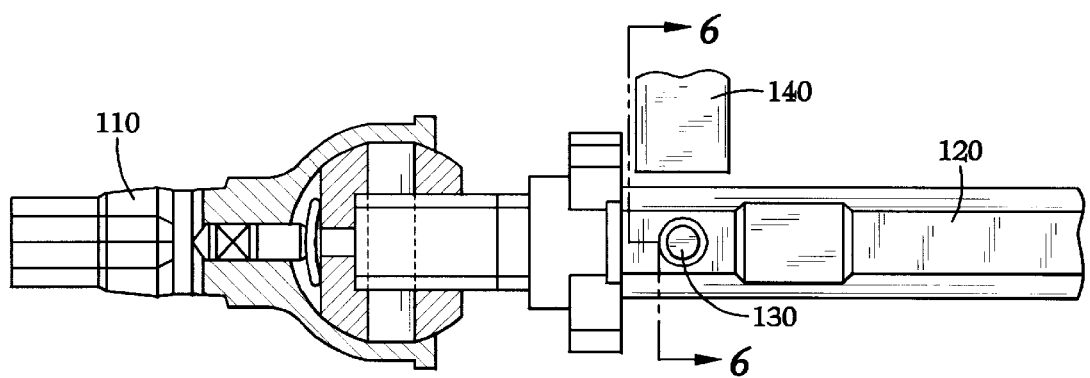
FIG. 5 is a fragmentary schematic side view of an alternative embodiment of the invention in the locked condition.

FIGS. 1, 2 and 3a–c show the features of the preferred embodiment of the invention in the unlocked and locked states, respectively. A steering wheel (not shown) is mounted on a steering column 10 which has an upper steering shaft 15 and a lower steering shaft 30. Pins 35 are permanently fixed to the shaft 30 and project radially outward therefrom. A locking bar 20 is mounted to a fixed part of the auto mobile chassis adjacent to the lower steering shaft 30 and is free to reciprocate axially between an unlocked position seen in FIG. 1 and a locked position seen in FIG. 2. In the unlocked position, the pins 35 projecting from the shaft 30 swing past the upper end of the locking bar 20 when the shaft is rotated. The pins 35 strike the locking bar 20, as shown in FIGS. 3a and 3c, when the steering shaft 35 is rotated and when the locking bar is in the locked condition, to limit the rotation of the shaft. Depending upon the sizes of the locking bar 20 and the pins 35, the limits of rotation of the shaft 30 in the locked condition may be greater or lesser. In the example illustrated, the total rotational freedom is about 80° and can be decreased by increasing the sizes of the engaging parts or changing their shapes, as by designing the locking bar 20 to wrap slightly around the shaft 30. Conversely, the limits can be increased by decreasing sizes or by decreasing the closeness of engagement. The pins 35 may be installed by press fitting a single long pin into a transverse bore in the shaft 30, press fitting individual short pins into oppositely disposed bores in the shaft, or welding individual pins to the shaft. Although it is illustrated as having two pins 35, the locking device can as well be made using a single pin and an appropriately sized and shaped locking bar to provide the desired rotational limits to the steering shaft.

A second embodiment of the invention is illustrated in FIGS. 4, 5, 6a, and 6b. In this case, a steering column 100 comprises an upper shaft 110 and a lower shaft 120. Pins 130 project transversely from shaft 120 in alignment with a locking pawl or bar 140, which is mounted to a fixed portion of the vehicle chassis and is free to reciprocate radially toward and away from the steering shaft 120, in response to locking and unlocking of an ignition switch (not shown), to lock or unlock the steering shaft. Except for the direction of reciprocation of the locking bar 140, the operation of this embodiment of the invention is identical to that of the first preferred embodiment discussed above. When unlocked, the pins 130 swing past the locking bar 140 upon rotation of the steering shaft 120, and conversely, when locked the pins 130 strike the locking bar 140, as before.

In both embodiments, the degree of steering column 10, 100 rotation permitted in the locked condition depends upon the sizes of the engaging components and the intimacy of their engagement. It is possible to minimize rotational freedom of the steering shaft 30, 120 by precisely matching and aligning the pins 35, 130 and the locking bars 20, 140. However, such matching and alignment would make it impossible to lock the steering shaft 30, 20 except in precisely aligned positions of the shaft 30, 20. Moreover, such precision matching and alignment adds considerably to the costs of manufacturing the steering column without appreciably increasing the theft resistance of the vehicle. For practical reasons, therefore, a limited amount of rotational freedom for the steering shaft is acceptable in the locked condition.

Figures 6A, 6B, 7:
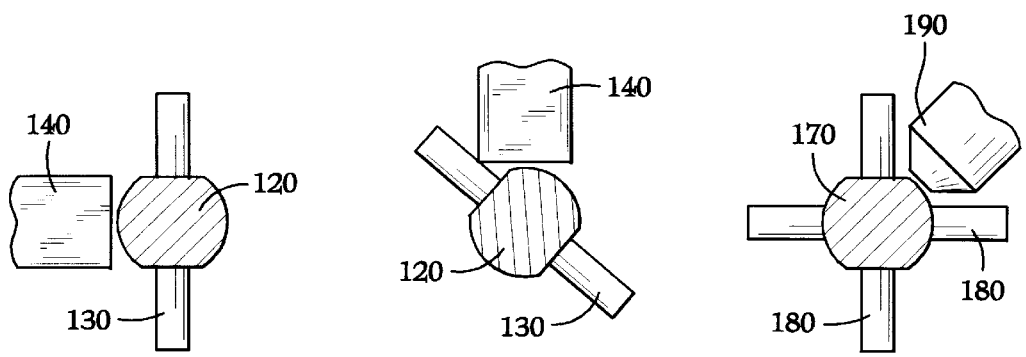
FIGS. 6a and 6b are schematic sectional end views taken at 6—6 of FIG. 5.
FIG. 7 is a schematic sectional end view of another embodiment of the invention.

FIG. 7 shows another embodiment of the invention providing four pins 180 on the steering shaft 170. The example illustrates a radially reciprocatable locking bar 190, although an axially reciprocatable bar could be used as well. Such an embodiment can be readily visualized in terms of FIG. 3 and FIG. 7. By providing the four pins 180, we have decreased the rotational limits of the steering shaft 170 without significantly decreasing the ease of locking.

Finally, the Figures. illustrate a steering column having upper and lower steering shafts and locking devices engaging the lower shaft. The invention is equally applicable to steering columns in which the locking device engages the upper shaft or to steering columns having only one shaft and a locking device engaging therewith.

Having described the invention, I claim:

1. A locking device for locking a steering column of a vehicle against rotation, relative to a fixed structure of said vehicle, said steering column including a steering shaft, the device comprising:

a single locking bar attached to said fixed structure of said vehicle, said locking bar being reciprocatable between locked and unlocked positions adjacent to said steering shaft; and means permanently fixed to said steering shaft and projecting radially outwardly from said steering shaft for engagement by said locking bar, when said locking bar is in the locked position, to limit rotation of said steering shaft.

2. The locking device of claim 1, wherein the means permanently fixed to and projecting transversely from said steering shaft for engagement by said locking bar comprises at least one pin.

3. The locking device of claim 1, wherein the means projecting transversely from said steering shaft comprises a single pin permanently fixed within a transversely bored hole in said shaft.

4. The locking device of claim 1, wherein the locking bar is axially reciprocatable for engagement and disengagement with said means permanently fixed to and projecting transversely from said steering shaft.

5. The locking device of claim 1, wherein the locking bar is radially reciprocatable for engagement with and for disengagement from said means permanently fixed to and projecting transversely from said steering shaft.

* * * * *